US011412444B2

(12) United States Patent
Cui et al.

(10) Patent No.: US 11,412,444 B2
(45) Date of Patent: Aug. 9, 2022

(54) FACILITATION OF RADIO ACCESS NEIGHBOR RELATIONSHIPS FOR 5G OR OTHER NEXT GENERATION NETWORK

(71) Applicant: AT&T Intellectual Property I, L.P., Atlanta, GA (US)

(72) Inventors: Zhi Cui, Sugar Hill, GA (US); Hongyan Lei, Plano, TX (US); Paul Smith, Jr., Heath, TX (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 70 days.

(21) Appl. No.: 17/103,040

(22) Filed: Nov. 24, 2020

(65) Prior Publication Data

US 2022/0167259 A1    May 26, 2022

(51) Int. Cl.
*H04W 28/08*   (2009.01)
*H04W 48/18*   (2009.01)
(Continued)

(52) U.S. Cl.
CPC ......... *H04W 48/18* (2013.01); *H04L 41/0896* (2013.01); *H04W 24/02* (2013.01); *H04W 36/0083* (2013.01); *H04W 36/14* (2013.01)

(58) Field of Classification Search
CPC ..... H04W 16/02; H04W 16/04; H04W 16/06; H04W 16/08; H04W 16/10; H04W 28/0284; H04W 28/0289; H04W 28/08; H04W 28/0808; H04W 28/0815; H04W 28/0819; H04W 28/0823; H04W 28/0827; H04W 28/0831; H04W 28/0835; H04W 28/0838; H04W 28/24; H04W 28/26; H04W 48/18; H04W 24/02; H04W 36/0083; H04W 36/14; H04L 2001/0096; H04L 5/003; H04L 5/0032; H04L 5/0035; H04L 5/0037; H04L 5/0039; H04L 5/0041; H04L 5/0046; H04L 5/0044;
(Continued)

(56) References Cited

U.S. PATENT DOCUMENTS

2018/0316615 A1* 11/2018 Shaw ................. H04L 43/0876
2018/0316627 A1* 11/2018 Cui ....................... H04L 47/808
2018/0324602 A1* 11/2018 Griot ................... H04W 72/005

OTHER PUBLICATIONS

""'5G; NR; Overall description; Stage-2(3GPP TS 38.300 version 15.3.1 Release 15)'"" 3GPP, ETSI TS 138 300 V15.3.1 (Oct. 2018, 90 pages."
(Continued)

*Primary Examiner* — Huy C Ho
(74) *Attorney, Agent, or Firm* — Amin, Turocy & Watson, LLP

(57) ABSTRACT

Automatic neighbor relationships (ANR) can be implemented within a radio access network intelligent controller (RIC), which receives load information from network nodes and user equipment measurements from user equipment. The RIC can create and maintain real-time load information and leverage slicing knowledge of neighbor cells during mobility to direct the user equipment to various network slices. Thus, an enhanced radio access network (RAN) neighbor relationship that utilizes slicing information can provide slice level RAN neighbor visibility on top of physical ANR relationships to enable enhancements for mobility management optimization.

20 Claims, 10 Drawing Sheets

(51) Int. Cl.
    *H04W 24/02* (2009.01)
    *H04L 41/0896* (2022.01)
    *H04W 36/14* (2009.01)
    *H04W 36/00* (2009.01)

(58) Field of Classification Search
    CPC ..... H04L 5/0058; H04L 5/006; H04L 5/0064; H04L 41/20; H04L 41/5003; H04L 41/5009; H04L 41/5025; H04L 41/0896
    See application file for complete search history.

(56) References Cited

OTHER PUBLICATIONS

"3rd Generation Partnership Project; Technical Specification Group Services and System Aspects; System architecture for the 5G System (5GS); Stage 2 (Release 16)" 3GPP TS 23.501 V16.6.0 (Sep. 2020), 447 pages.

* cited by examiner

FIG. 5

| Neighb oring Cells to UE | RAT | DU | CU | Virtualizat ion | Type | Slice Capabilities | VoNR Preference |
|---|---|---|---|---|---|---|---|
| 1 | 5G | DU1 | CU1 | Yes | mmW | ULLC, H-BW | Not Preferred |
| 2 | 5G | DU1 | CU1 | Yes | mmW | ULLC | Not Preferred |
| 3 | 5G | DU2 | CU1 | Yes | Sub-6 | mIOT, M-BW, VoNR | Preferred |
| 4 | 5G | DU3 | CU2 | Yes | Sub-6 | M-BW, VoNR | Preferred |

500

FACILITATION OF RADIO ACCESS
NEIGHBOR RELATIONSHIPS FOR 5G OR
OTHER NEXT GENERATION NETWORK

TECHNICAL FIELD

This disclosure relates generally to facilitating of radio access neighbor relationships. For example, this disclosure relates to facilitating radio access neighbor relationships for a 5G, or other next generation network, air interface.

BACKGROUND

5th generation (5G) wireless systems represent a next major phase of mobile telecommunications standards beyond the current telecommunications standards of $4^{th}$ generation (4G). Rather than faster peak Internet connection speeds, 5G planning aims at higher capacity than current 4G, allowing a higher number of mobile broadband users per area unit, and allowing consumption of higher or unlimited data quantities. This would enable a large portion of the population to stream high-definition media many hours per day with their mobile devices, when out of reach of wireless fidelity hotspots. 5G research and development also aims at improved support of machine-to-machine communication, also known as the Internet of things, aiming at lower cost, lower battery consumption, and lower latency than 4G equipment.

The above-described background relating to facilitating radio access neighbor relationships is merely intended to provide a contextual overview of some current issues, and is not intended to be exhaustive. Other contextual information may become further apparent upon review of the following detailed description.

BRIEF DESCRIPTION OF THE DRAWINGS

Non-limiting and non-exhaustive embodiments of the subject disclosure are described with reference to the following figures, wherein like reference numerals refer to like parts throughout the various views unless otherwise specified.

FIG. 5 illustrates an example schematic system block diagram of an automatic neighbor relationship according to one or more embodiments.

DETAILED DESCRIPTION

Figure 1:
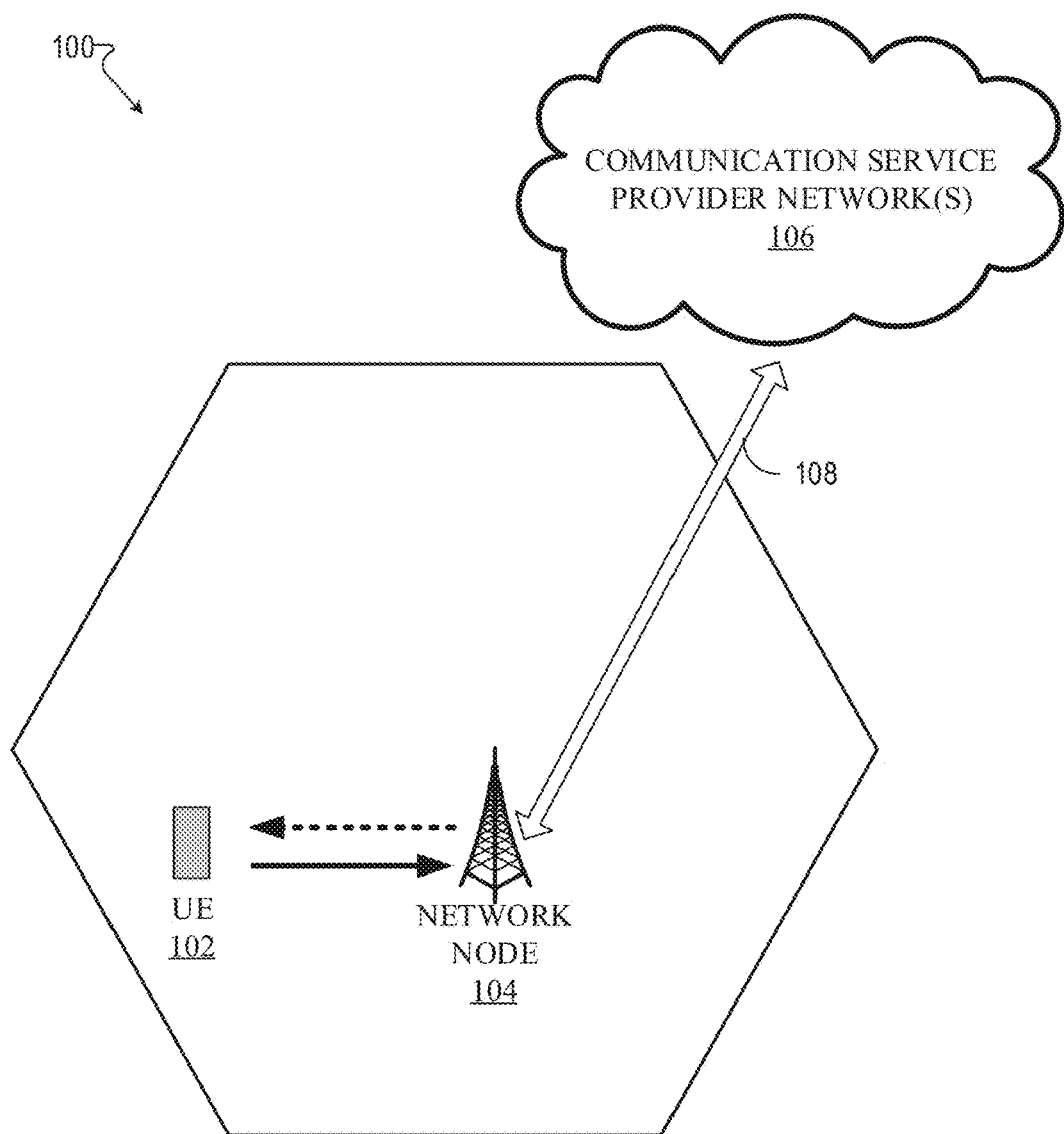
FIG. 1 illustrates an example wireless communication system in which a network node device (e.g., network node) and user equipment (UE) can implement various aspects and embodiments of the subject disclosure.

In the following description, numerous specific details are set forth to provide a thorough understanding of various embodiments. One skilled in the relevant art will recognize, however, that the techniques described herein can be practiced without one or more of the specific details, or with other methods, components, materials, etc. In other instances, well-known structures, materials, or operations are not shown or described in detail to avoid obscuring certain aspects.

Reference throughout this specification to "one embodiment," or "an embodiment," means that a particular feature, structure, or characteristic described in connection with the embodiment is included in at least one embodiment. Thus, the appearances of the phrase "in one embodiment," "in one aspect," or "in an embodiment," in various places throughout this specification are not necessarily all referring to the same embodiment. Furthermore, the particular features, structures, or characteristics may be combined in any suitable manner in one or more embodiments.

As utilized herein, terms "component," "system," "interface," and the like are intended to refer to a computer-related entity, hardware, software (e.g., in execution), and/or firmware. For example, a component can be a processor, a process running on a processor, an object, an executable, a program, a storage device, and/or a computer. By way of illustration, an application running on a server and the server can be a component. One or more components can reside within a process, and a component can be localized on one computer and/or distributed between two or more computers.

Further, these components can execute from various machine-readable media having various data structures stored thereon. The components can communicate via local and/or remote processes such as in accordance with a signal having one or more data packets (e.g., data from one component interacting with another component in a local system, distributed system, and/or across a network, e.g., the Internet, a local area network, a wide area network, etc. with other systems via the signal).

As another example, a component can be an apparatus with specific functionality provided by mechanical parts operated by electric or electronic circuitry; the electric or electronic circuitry can be operated by a software application or a firmware application executed by one or more processors; the one or more processors can be internal or external to the apparatus and can execute at least a part of the software or firmware application. As yet another example, a component can be an apparatus that provides specific functionality through electronic components without mechanical parts; the electronic components can include one or more processors therein to execute software and/or firmware that confer(s), at least in part, the functionality of the electronic components. In an aspect, a component can emulate an electronic component via a virtual machine, e.g., within a cloud computing system.

The words "exemplary" and/or "demonstrative" are used herein to mean serving as an example, instance, or illustration. For the avoidance of doubt, the subject matter disclosed herein is not limited by such examples. In addition, any aspect or design described herein as "exemplary" and/or "demonstrative" is not necessarily to be construed as preferred or advantageous over other aspects or designs, nor is it meant to preclude equivalent exemplary structures and techniques known to those of ordinary skill in the art. Furthermore, to the extent that the terms "includes," "has," "contains," and other similar words are used in either the detailed description or the claims, such terms are intended to be inclusive—in a manner similar to the term "comprising" as an open transition word—without precluding any additional or other elements.

As used herein, the term "infer" or "inference" refers generally to the process of reasoning about, or inferring states of, the system, environment, user, and/or intent from a set of observations as captured via events and/or data. Captured data and events can include user data, device data, environment data, data from sensors, sensor data, application data, implicit data, explicit data, etc. Inference can be employed to identify a specific context or action, or can generate a probability distribution over states of interest based on a consideration of data and events, for example.

Inference can also refer to techniques employed for composing higher-level events from a set of events and/or data. Such inference results in the construction of new events or actions from a set of observed events and/or stored event data, whether the events are correlated in close temporal proximity, and whether the events and data come from one or several event and data sources. Various classification schemes and/or systems (e.g., support vector machines, neural networks, expert systems, Bayesian belief networks, fuzzy logic, and data fusion engines) can be employed in connection with performing automatic and/or inferred action in connection with the disclosed subject matter.

In addition, the disclosed subject matter can be implemented as a method, apparatus, or article of manufacture using standard programming and/or engineering techniques to produce software, firmware, hardware, or any combination thereof to control a computer to implement the disclosed subject matter. The term "article of manufacture" as used herein is intended to encompass a computer program accessible from any computer-readable device, machine-readable device, computer-readable carrier, computer-readable media, or machine-readable media. For example, computer-readable media can include, but are not limited to, a magnetic storage device, e.g., hard disk; floppy disk; magnetic strip(s); an optical disk (e.g., compact disk (CD), a digital video disc (DVD), a Blu-ray Disc™ (BD)); a smart card; a flash memory device (e.g., card, stick, key drive); and/or a virtual device that emulates a storage device and/or any of the above computer-readable media.

As an overview, various embodiments are described herein to facilitate radio access neighbor relationships for a 5G air interface or other next generation networks. For simplicity of explanation, the methods are depicted and described as a series of acts. It is to be understood and appreciated that the various embodiments are not limited by the acts illustrated and/or by the order of acts. For example, acts can occur in various orders and/or concurrently, and with other acts not presented or described herein. Furthermore, not all illustrated acts may be desired to implement the methods. In addition, the methods could alternatively be represented as a series of interrelated states via a state diagram or events. Additionally, the methods described hereafter are capable of being stored on an article of manufacture (e.g., a machine-readable medium) to facilitate transporting and transferring such methodologies to computers. The term article of manufacture, as used herein, is intended to encompass a computer program accessible from any computer-readable device, carrier, or media, including a non-transitory machine-readable medium.

It should be noted that although various aspects and embodiments have been described herein in the context of 5G, Universal Mobile Telecommunications System (UMTS), and/or Long Term Evolution (LTE), or other next generation networks, the disclosed aspects are not limited to 5G, a UMTS implementation, and/or an LTE implementation as the techniques can also be applied in 3G, 4G or LTE systems. For example, aspects or features of the disclosed embodiments can be exploited in substantially any wireless communication technology. Such wireless communication technologies can include UMTS, Code Division Multiple Access (CDMA), Wi-Fi, Worldwide Interoperability for Microwave Access (WiMAX), General Packet Radio Service (GPRS), Enhanced GPRS, Third Generation Partnership Project (3GPP), LTE, Third Generation Partnership Project 2 (3GPP2) Ultra Mobile Broadband (UMB), High Speed Packet Access (HSPA), Evolved High Speed Packet Access (HSPA+), High-Speed Downlink Packet Access (HSDPA), High-Speed Uplink Packet Access (HSUPA), Zigbee, or another IEEE 802.12 technology. Additionally, substantially all aspects disclosed herein can be exploited in legacy telecommunication technologies.

Described herein are systems, methods, articles of manufacture, and other embodiments or implementations that can facilitate radio access neighbor relationships for a 5G network. Facilitating radio access neighbor relationships for a 5G network can be implemented in connection with any type of device with a connection to the communications network (e.g., a mobile handset, a computer, a handheld device, etc.) any Internet of things (IOT) device (e.g., toaster, coffee maker, blinds, music players, speakers, etc.), and/or any connected vehicles (cars, airplanes, space rockets, and/or other at least partially automated vehicles (e.g., drones)). In some embodiments the non-limiting term user equipment (UE) is used. It can refer to any type of wireless device that communicates with a radio network node in a cellular or mobile communication system. Examples of UE are target device, device to device (D2D) UE, machine type UE or UE capable of machine to machine (M2M) communication, PDA, Tablet, mobile terminals, smart phone, IOT device, laptop embedded equipped (LEE), laptop mounted equipment (LME), USB dongles, etc. The embodiments are applicable to single carrier as well as to multicarrier (MC) or carrier aggregation (CA) operation of the UE. The term carrier aggregation (CA) is also called (e.g. interchangeably called) "multi-carrier system", "multi-cell operation", "multi-carrier operation", "multi-carrier" transmission and/or reception.

In some embodiments, the non-limiting term radio network node or simply network node is used. It can refer to any type of network node that serves a UE or network equipment connected to other network nodes or network elements or any radio node from where UE receives a signal. Non-exhaustive examples of radio network nodes are Node B, base station (BS), multi-standard radio (MSR) node such as MSR BS, eNode B, gNode B, network controller, radio network controller (RNC), base station controller (BSC), relay, donor node controlling relay, base transceiver station (BTS), edge nodes, edge servers, network access equipment, network access nodes, a connection point to a telecommunications network, such as an access point (AP), transmission points, transmission nodes, RRU, RRH, nodes in distributed antenna system (DAS), etc.

Cloud radio access networks (RAN) can enable the implementation of concepts such as software-defined network (SDN) and network function virtualization (NFV) in 5G networks. This disclosure can facilitate a generic channel state information framework design for a 5G network. Certain embodiments of this disclosure can include an SDN controller that can control routing of traffic within the network and between the network and traffic destinations. The SDN controller can be merged with the 5G network architecture to enable service deliveries via open application programming interfaces ("APIs") and move the network core towards an all internet protocol ("IP"), cloud based, and software driven telecommunications network. The SDN controller can work with, or take the place of policy and charging rules function ("PCRF") network elements so that policies such as quality of service and traffic management and routing can be synchronized and managed end to end.

5G, also called new radio (NR) access, networks can support the following: data rates of several tens of megabits per second supported for tens of thousands of users; 1 gigabit per second can be offered simultaneously to tens of workers on the same office floor; several hundreds of thousands of simultaneous connections can be supported for massive sensor deployments; spectral efficiency can be enhanced compared to 4G; improved coverage; enhanced signaling efficiency; and reduced latency compared to LTE. In multicarrier systems such as OFDM, each subcarrier can occupy bandwidth (e.g., subcarrier spacing). If the carriers use the same bandwidth spacing, then it can be considered a single numerology. However, if the carriers occupy different bandwidth and/or spacing, then it can be considered a multiple numerology.

A radio access network intelligent controller (RIC) can allow a global view of a radio access network (RAN) and can provide intelligent control and optimization. Although there is a physical relationship between eNodeBs and gNodeBs, a slicing concept can be applied to the physical relationships based on services provided by various cells. The automatic neighbor relationship (ANR) can include information about which neighbors have various slicing capabilities.

An ANR micro-service can be added to the RIC. The ANR micro-service can comprise an ANR table that determines the slicing of the cells based on the slicing capabilities of the cells. Various xApps (e.g., types of software) can utilize an ANR-slicing capability (SC) to perform mobility enhancement functions (e.g., load balancing, handover, proactive mobility handover, etc.) The various slicing capabilities can comprise: URLLC, massive IoT, medium bandwidth throughput, high bandwidth throughput, vehicle to everything, voice over NR, etc. Cells can be split on different slices, depending upon their capabilities, to support different services. For example, some cells can be placed on an ultra-reliable low latency service slice and other cells can be placed on a high throughput service slice.

An abstraction layer can separate the physical radios and logical view of the radio network. Thus, various radio resources from various radio technologies can be utilized. Network slices can be created to address specific needs of service calls, or transport, or access capability. Thus, the access network can be divided by slices to separately address multiple needs. The slice of an access layer can be vertical or horizontal and can manage a defined number of radios with various frequencies and various capabilities. For example, an access slice can comprise a resource management function, a radio control function, and other capabilities to aid a specific function. The resource management function can determine, for the radio controller function, how many resources it needs, which can depend on what type of service it is using.

Network slicing capabilities can enable edge computing for microservices to be provided directly to an end user. By utilizing a dedicated slice, existing network resources and other available resources can be enabled to service UEs 102. The network slice can also be dedicated for a specific network function (e.g., extended reality, augmented reality, and/or virtual reality) to manage and allocate network resources.

ANR can be implemented inside the RIC which receives the load info from eNBs and gNBs, as well as the UE measurements, which the RIC can create and maintain with real-time load info to facilitate further intelligent mobility management and optimization. Without slicing knowledge of neighbor cells during mobility, the slice-based service may get interrupted or is not consistent. This disclosure proposes an enhanced RAN neighbor relationship with a slicing capability (ANR-SC) xApp which can provide slice level RAN neighbor visibility on top of physical ANR relationships to enable enhancements to mobility management optimization via slice and RAN capability-based mobility management for 5G and beyond.

In one embodiment, described herein is a method comprising receiving, by network equipment comprising a processor, cell data representative of a neighbor relationship between a first network cell and a second network cell. The method can comprise receiving, by the network equipment, first capability data representative of a first capability of the first network cell, and second capability data representative of a second capability of the second network cell. The method can comprise determining, by the network equipment, a difference between the first capability and the second capability. Additionally, based on the difference, the method can comprise splitting, by the network equipment, the first network cell and the second network cell onto a first network slice and a second network slice, respectively. Furthermore, in response to receiving resource request data representative of a resource requested from a user equipment, the method can comprise allocating, by the network equipment, the resource from the first network cell to the user equipment based on the first capability.

According to another embodiment, a system can facilitate receiving first capability data representative of a first capability of the first network cell, and receiving second capability data representative of a second capability of the second network cell after determining a neighbor relationship between a first network cell and a second network cell. Based on determining that the first capability is different than the second capability, the system can comprise allocating a first network slice, to the first network cell, that is different than a second network slice allocated to the second network cell. Additionally, in response to receiving resource request data representative of a resource requested from a user equipment, the system can facilitate allocating a resource of the first network cell to the user equipment based on the first capability.

According to yet another embodiment, described herein is a machine-readable medium that can perform the operations comprising receiving neighbor relationship data representative of a neighbor relationship between a first network cell and a second network cell. The machine-readable medium can perform the operations comprising receiving neighbor relationship data representative of a neighbor relationship between a first network cell and a second network cell. The machine-readable medium can perform the operations comprising receiving first capability data representative of a first capability of the first network cell. The machine-readable medium can perform the operations comprising receiving second capability data representative of a second capability of the second network cell. In response to receiving the neighbor relationship data, the machine-readable medium can perform the operations comprising the first capability data and the second capability data, determining that the first capability is different than the second capability. Based on the determining that the first capability is different than the second capability, the machine-readable medium can perform the operations comprising allocating a first network slice, to the first network cell, that is different than a second network slice allocated to the second network cell. Furthermore, in response to receiving resource request data representative of a resource requested from a user equipment, the machine-readable medium can perform the operations comprising allocating a resource of the first network cell to the user equipment based on the first capability.

These and other embodiments or implementations are described in more detail below with reference to the drawings.

Referring now to FIG. 1, illustrated is an example wireless communication system 100 in accordance with various aspects and embodiments of the subject disclosure. In one or more embodiments, system 100 can include one or more user equipment UEs 102. The non-limiting term user equipment can refer to any type of device that can communicate with a network node in a cellular or mobile communication system. A UE can have one or more antenna panels having vertical and horizontal elements. Examples of a UE include a target device, device to device (D2D) UE, machine type UE or UE capable of machine to machine (M2M) communications, personal digital assistant (PDA), tablet, mobile terminals, smart phone, laptop mounted equipment (LME), universal serial bus (USB) dongles enabled for mobile communications, a computer having mobile capabilities, a mobile device such as cellular phone, a laptop having laptop embedded equipment (LEE, such as a mobile broadband adapter), a tablet computer having a mobile broadband adapter, a wearable device, a virtual reality (VR) device, a heads-up display (HUD) device, a smart car, a machine-type communication (MTC) device, and the like. User equipment UE 102 can also include IOT devices that communicate wirelessly.

In various embodiments, system 100 is or includes a wireless communication network serviced by one or more wireless communication network providers. In example embodiments, a UE 102 can be communicatively coupled to the wireless communication network via a network node 104. The network node (e.g., network node device) can communicate with user equipment (UE), thus providing connectivity between the UE and the wider cellular network. The UE 102 can send transmission type recommendation data to the network node 104. The transmission type recommendation data can include a recommendation to transmit data via a closed loop MIMO mode and/or a rank-1 precoder mode.

A network node can have a cabinet and other protected enclosures, an antenna mast, and multiple antennas for performing various transmission operations (e.g., MIMO operations). Network nodes can serve several cells, also called sectors, depending on the configuration and type of antenna. In example embodiments, the UE 102 can send and/or receive communication data via a wireless link to the network node 104. The dashed arrow lines from the network node 104 to the UE 102 represent downlink (DL) communications and the solid arrow lines from the UE 102 to the network nodes 104 represents an uplink (UL) communication.

System 100 can further include one or more communication service provider networks 106 that facilitate providing wireless communication services to various UEs, including UE 102, via the network node 104 and/or various additional network devices (not shown) included in the one or more communication service provider networks 106. The one or more communication service provider networks 106 can include various types of disparate networks, including but not limited to: cellular networks, femto networks, picocell networks, microcell networks, internet protocol (IP) networks Wi-Fi service networks, broadband service network, enterprise networks, cloud based networks, and the like. For example, in at least one implementation, system 100 can be or include a large scale wireless communication network that spans various geographic areas. According to this implementation, the one or more communication service provider networks 106 can be or include the wireless communication network and/or various additional devices and components of the wireless communication network (e.g., additional network devices and cell, additional UEs, network server devices, etc.). The network node 104 can be connected to the one or more communication service provider networks 106 via one or more backhaul links 108. For example, the one or more backhaul links 108 can include wired link components, such as a T1/E1 phone line, a digital subscriber line (DSL) (e.g., either synchronous or asynchronous), an asymmetric DSL (ADSL), an optical fiber backbone, a coaxial cable, and the like. The one or more backhaul links 108 can also include wireless link components, such as but not limited to, line-of-sight (LOS) or non-LOS links which can include terrestrial air-interfaces or deep space links (e.g., satellite communication links for navigation).

Wireless communication system 100 can employ various cellular systems, technologies, and modulation modes to facilitate wireless radio communications between devices (e.g., the UE 102 and the network node 104). While example embodiments might be described for 5G new radio (NR) systems, the embodiments can be applicable to any radio access technology (RAT) or multi-RAT system where the UE operates using multiple carriers e.g. LTE FDD/TDD, GSM/GERAN, CDMA2000 etc.

For example, system 100 can operate in accordance with global system for mobile communications (GSM), universal mobile telecommunications service (UMTS), long term evolution (LTE), LTE frequency division duplexing (LTE FDD, LTE time division duplexing (TDD), high speed packet access (HSPA), code division multiple access (CDMA), wideband CDMA (WCMDA), CDMA2000, time division multiple access (TDMA), frequency division multiple access (FDMA), multi-carrier code division multiple access (MC-CDMA), single-carrier code division multiple access (SC-CDMA), single-carrier FDMA (SC-FDMA), orthogonal frequency division multiplexing (OFDM), discrete Fourier transform spread OFDM (DFT-spread OFDM) single carrier FDMA (SC-FDMA), Filter bank based multi-carrier (FBMC), zero tail DFT-spread-OFDM (ZT DFT-s-OFDM), generalized frequency division multiplexing (GFDM), fixed mobile convergence (FMC), universal fixed mobile convergence (UFMC), unique word OFDM (UW-OFDM), unique word DFT-spread OFDM (UW DFT-Spread-OFDM), cyclic prefix OFDM CP-OFDM, resource-block-filtered OFDM, Wi Fi, WLAN, WiMax, and the like. However, various features and functionalities of system 100 are particularly described wherein the devices (e.g., the UEs 102 and the network node 104) of system 100 are configured to communicate wireless signals using one or more multi carrier modulation schemes, wherein data symbols can be transmitted simultaneously over multiple frequency subcarriers (e.g., OFDM, CP-OFDM, DFT-spread OFMD, UFMC, FMBC, etc.). The embodiments are applicable to single carrier as well as to multicarrier (MC) or carrier aggregation (CA) operation of the UE. The term carrier aggregation (CA) is also called (e.g. interchangeably called) "multi-carrier system", "multi-cell operation", "multi-carrier operation", "multi-carrier" transmission and/or reception. Note that some embodiments are also applicable for Multi RAB (radio bearers) on some carriers (that is data plus speech is simultaneously scheduled).

In various embodiments, system 100 can be configured to provide and employ 5G wireless networking features and functionalities. 5G wireless communication networks are expected to fulfill the demand of exponentially increasing data traffic and to allow people and machines to enjoy gigabit data rates with virtually zero latency. Compared to 4G, 5G supports more diverse traffic scenarios. For example, in addition to the various types of data communication between conventional UEs (e.g., phones, smartphones, tablets, PCs, televisions, Internet enabled televisions, etc.) supported by 4G networks, 5G networks can be employed to support data communication between smart cars in association with driverless car environments, as well as machine type communications (MTCs). Considering the drastic different communication demands of these different traffic scenarios, the ability to dynamically configure waveform parameters based on traffic scenarios while retaining the benefits of multi carrier modulation schemes (e.g., OFDM and related schemes) can provide a significant contribution to the high speed/capacity and low latency demands of 5G networks. With waveforms that split the bandwidth into several sub-bands, different types of services can be accommodated in different sub-bands with the most suitable waveform and numerology, leading to an improved spectrum utilization for 5G networks.

To meet the demand for data centric applications, features of proposed 5G networks may include: increased peak bit rate (e.g., 20 Gbps), larger data volume per unit area (e.g., high system spectral efficiency—for example about 3.5 times that of spectral efficiency of long term evolution (LTE) systems), high capacity that allows more device connectivity both concurrently and instantaneously, lower battery/power consumption (which reduces energy and consumption costs), better connectivity regardless of the geographic region in which a user is located, a larger numbers of devices, lower infrastructural development costs, and higher reliability of the communications. Thus, 5G networks may allow for: data rates of several tens of megabits per second should be supported for tens of thousands of users, 1 gigabit per second to be offered simultaneously to tens of workers on the same office floor, for example; several hundreds of thousands of simultaneous connections to be supported for massive sensor deployments; improved coverage, enhanced signaling efficiency; reduced latency compared to LTE.

The 5G access network may utilize higher frequencies (e.g., >6 GHz) to aid in increasing capacity. Currently, much of the millimeter wave (mmWave) spectrum, the band of spectrum between 30 gigahertz (GHz) and 300 GHz is underutilized. The millimeter waves have shorter wavelengths that range from 10 millimeters to 1 millimeter, and these mmWave signals experience severe path loss, penetration loss, and fading. However, the shorter wavelength at mmWave frequencies also allows more antennas to be packed in the same physical dimension, which allows for large-scale spatial multiplexing and highly directional beamforming.

Performance can be improved if both the transmitter and the receiver are equipped with multiple antennas. Multi-antenna techniques can significantly increase the data rates and reliability of a wireless communication system. The use of multiple input multiple output (MIMO) techniques, which was introduced in the third-generation partnership project (3GPP) and has been in use (including with LTE), is a multi-antenna technique that can improve the spectral efficiency of transmissions, thereby significantly boosting the overall data carrying capacity of wireless systems. The use of multiple-input multiple-output (MIMO) techniques can improve mmWave communications, and has been widely recognized a potentially important component for access networks operating in higher frequencies. MIMO can be used for achieving diversity gain, spatial multiplexing gain and beamforming gain. For these reasons, MIMO systems are an important part of the 3rd and 4th generation wireless systems, and are planned for use in 5G systems.

Figure 2:
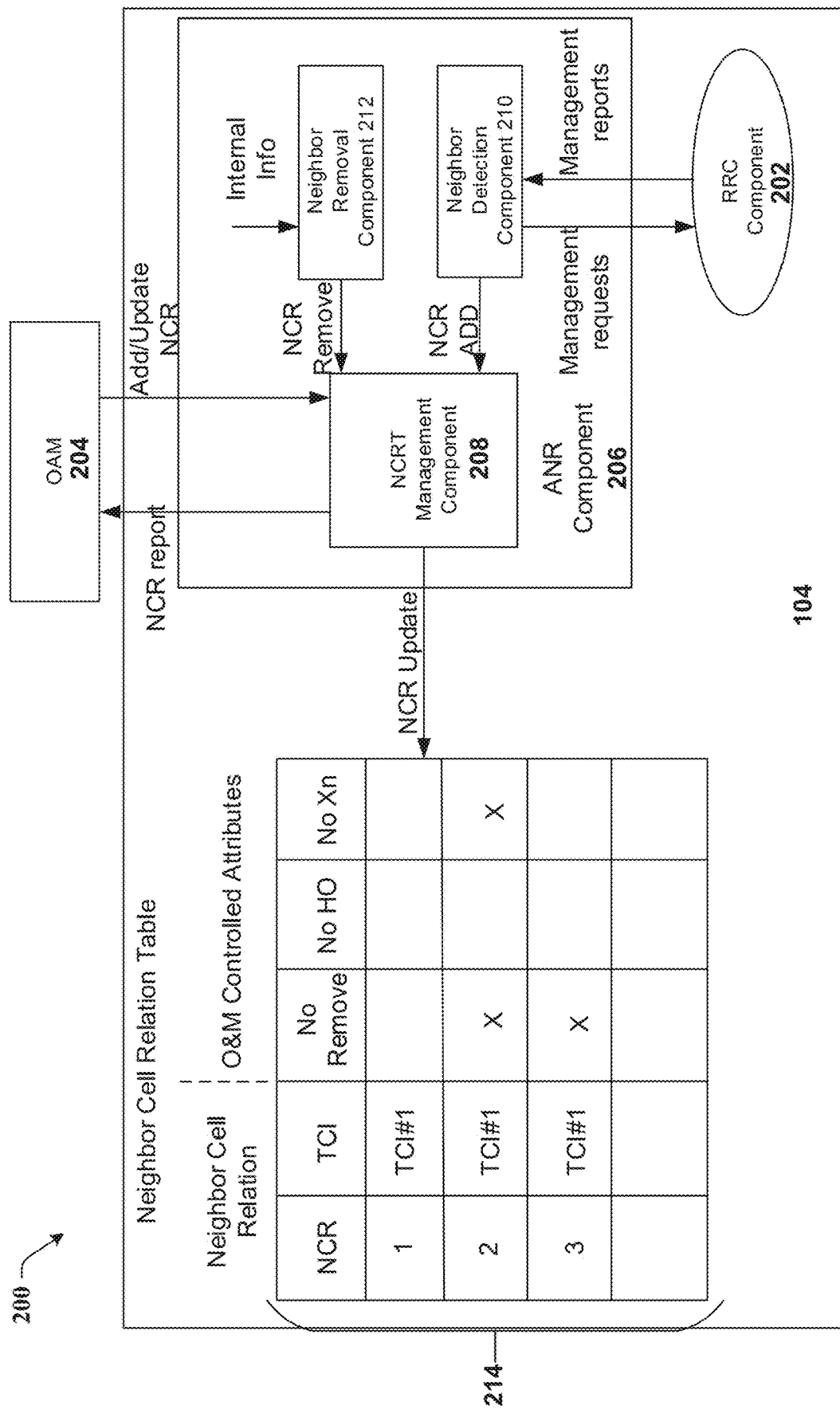
FIG. 2 illustrates an example schematic system block diagram of a 5G radio access technology neighbor cell relationships according to one or more embodiments.

Referring now to FIG. 2, illustrated is an example schematic system block diagram of a neighbor cell relation table in one or more embodiments.

ANR can add or remove a neighbor relationship. Xn is the interface between gNodeBs. No remove means that the ANR shall not remove the relationship between gNode Bs. Within a gNode B there may be many cells (e.g., NCRs), and the target cell ID (TCI) is who the cell is serving. In addition to the traditional ANR table that can comprise the no remove, no handover, and Xn as basic info, additional columns can be added to the table 214. The additional columns can comprise a 5G NR-LTE direct connectivity preference, RAT (e.g., 5G or LTE) virtualized cell, gNB-centralized unit (CU) ID, gNB-distributed unit (DU) ID, etc. Because some cells may not be preferred for dual connectivity, the additional data can be added to the table 214 to help the system 200 to make more intelligent decisions.

The system 200 can comprise an operations administration and management (OAM) component 204 that can bi-directionally communicate with an ANR component 206 of a gNodeB (e.g., network node 104). For example, the ANR component 206 can comprise a neighbor cell relation table (NCRT) management component 208, a neighbor removal component 212, and a neighbor detection component 210. The neighbor removal component 212 can be configured to remove neighbor relations based on internal data (e.g., quality, location, virtualization, etc.) of the ANR component 206 and send neighbor removal data to the NCRT management component 208. Conversely, a neighbor detection component 210 can detect neighbors based on data received (e.g., quality, location, virtualization, etc.) from a radio resource control (RRC) component 202. For example, the neighbor detection component 210 can send management request data to the RRC component 202 and in return receive management report data from the RRC component 502. Based on the management report data, the neighbor detection component 210 can then generate neighbor data and send the neighbor data to the NCRT management component 208 to facilitate the addition of a neighbor relationship. The OAM component 204 can also add/update neighbor relationships at the NCRT management component 208 and receive reports from the NCRT management component 208. The NCRT management component 208 can take data from the OAM component 204, the neighbor detection component 210, and/or the neighbor removal component 212 and generate data to send to the NCRT 214 to update the NCRT 214.

Figure 3:
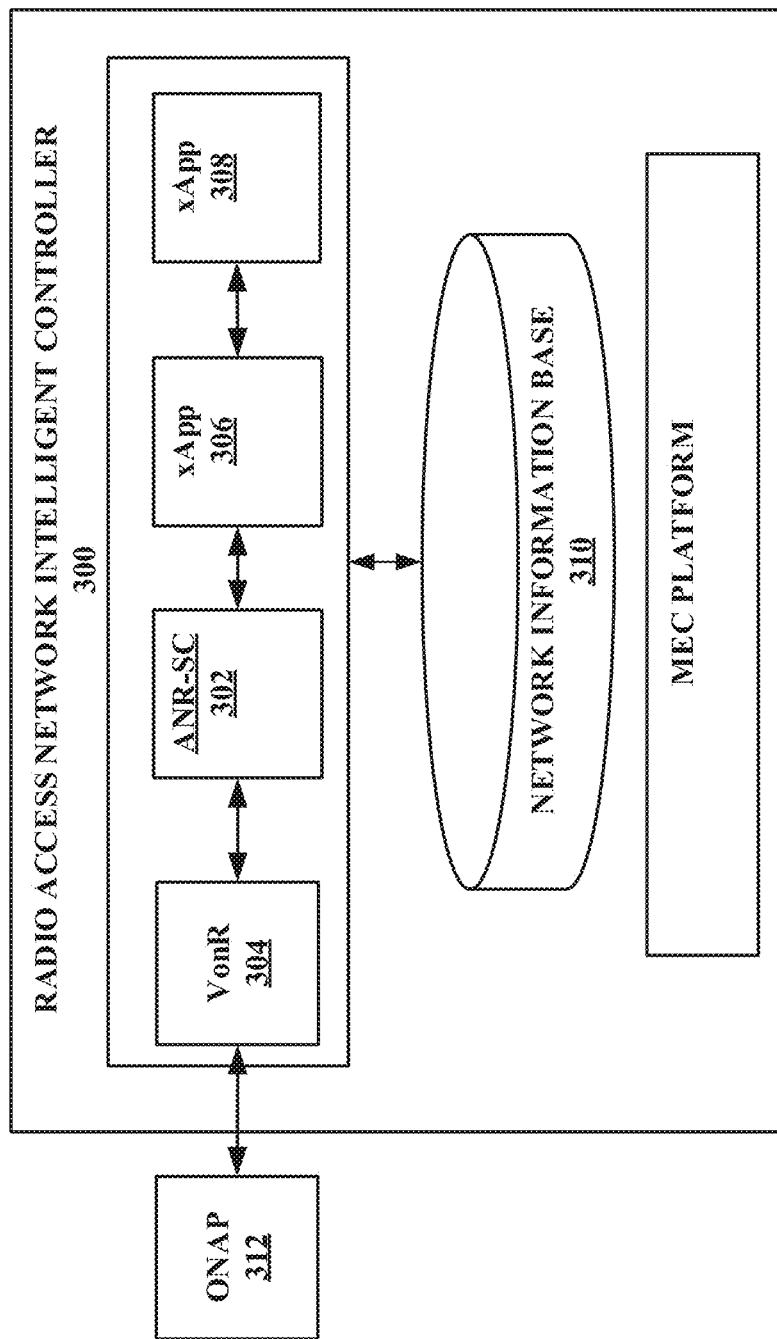
FIG. 3 illustrates an example schematic system block diagram of an example schematic system block diagram of a radio access network intelligent controller according to one or more embodiments.

Referring now to FIG. 3, illustrated is an example schematic system block diagram of a radio access network intelligent controller in one or more embodiments.

RIC 300 functions can be implemented by micro-services (e.g., ANR-SC, xApp, or the like). An enhanced RIC framework can comprise an ANR-SC 302 and a network information base 310. The RIC 300 can also comprise extensible real-time xApps 304, 306, 308 coupled with operator intent policy (not shown), and can receive real time data from the network, and allow users and network-AI to enable more granular RAN control, provide greater flexibility and improve RAN efficiency. The RIC 300 platform can support various RAN control functions ranging from basic RAN control functions such as traffic steering and mobility management to the enhanced RAN control functions. RIC 300 supported xApps 304, 306, 308 can be centralized at an edge cloud or distributed (e.g., eNB or gNB).

The enhanced RAN neighbor relations with slicing capability (ANR-SC) can provide slice level RAN neighbor visibility on top of a physical ANR relationship to enable enhancements to mobility management optimization via slice and RAN capability-based mobility management for 5G and beyond. For instance, in 5G+, ultra-reliable low latency services have stringent latency requirement to the mobility network. An ANR-SC can provide the low latency service tier slice capability indicator to the cells with such capability.

In alternative embodiments, the RIC 300 can comprise a function that can perform coordination and conflict resolution of the RIC 300 functions. Based on policies, network state, and/or UE states, the function can dynamically create the composition of the RIC micro-services to meet service needs. The policy can specify the intent of how the traffic should be treated. The function can receive inputs from the real time network data and AI/ML results to establish decisions including trigger conditions (e.g., types of services, network conditions, RF and/or physical locations, UE conditions and capabilities, etc.), and actions (e.g., what signatures RIC micro-services can trigger, and what signatures/actions can have priorities over others, based on the input from the policy). Thus, tailored actions can be provided based on different types of services, slices, locations, and users to prevent a violation of a service level agreement (SLA). For example, an operator (e.g., service provider) can provide a dynamic policy to the RIC, via an AI interface, regarding how traffic types (e.g., first respondent user versus voice, high speed data, video traffic, large downloads, etc.). For example, the policy operator can upload a slice profile of a URLLC with a desired amount of network resource (e.g., RAN physical resource blocks (PRBs) that can be used to carry user traffic).

Figure 4:
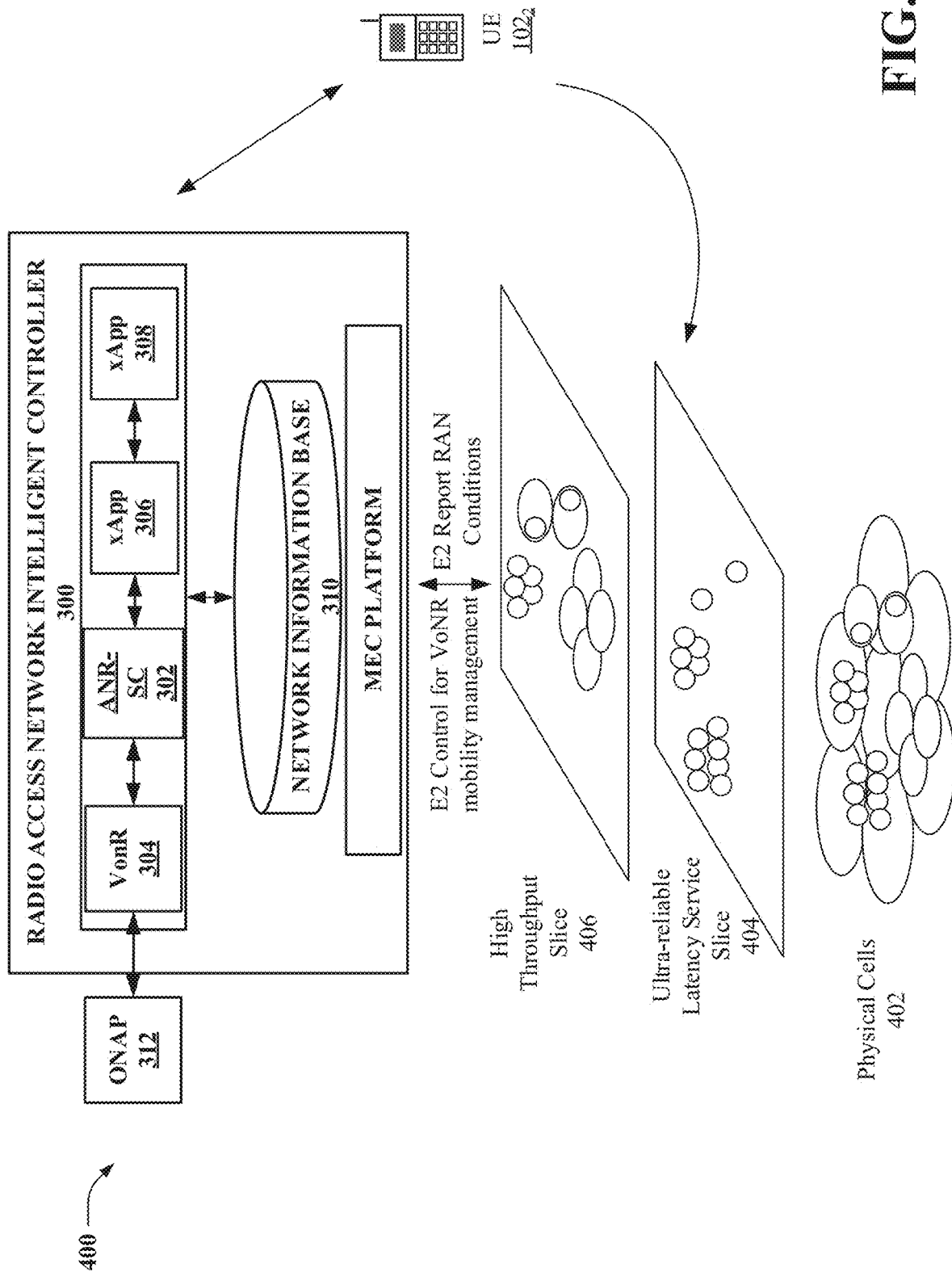
FIG. 4 illustrates an example schematic system block diagram of a radio access network intelligent controller automatic neighbor relationship slicing capability function according to one or more embodiments.

Referring now to FIG. 4 and FIG. 5, illustrated is an example schematic system block diagram of a radio access network intelligent controller automatic neighbor relationship slicing capability function and an automatic neighbor relationship in one or more embodiments.

FIG. 4 depicts the ANR-SC 302 added to the RIC 300 for facilitating a slice-based function system 400. The physical cells (e.g., small cells, millimeter wave cells, mid-band, low-band, and the like) can have neighbor relationships that are logged in the ANR table 500 as depicted by FIG. 5. The ANR-SC 302 can perform a slicing function on the physical cells to slice them based on their cell type. For example, the ultra-reliable low latency service slice can comprise the physicals cells that facilitate ultra-reliable low latency. Effectively, the physical cells 402 can be placed on different slices (e.g., the ultra-reliable low latency service slice, the high throughput slice 406) to support different services as depicted in FIG. 4. The ANR-SC 302 can comprise the ANR table 500. The ANR-SC 302 can be a basic building block for the RIC 300 and can view and update the ANR table 500. The xApps 304, 306, 308 can utilize the ANR-SC 302 to perform mobility enhancement functions (e.g., load balancing, handover, proactive mobility handover, etc.) leveraging the ANR table 500 to determine which physical cell to move the UE 102. Thus, the ANR-SC 302 can provide the xApps 304, 306, 308, with context regarding to what layer to move the UE 102, based on the functionalities of the physical cells on each slice. Once the slice-determination has been made based on the table, the RIC can communicate this to the UE 102 to move the UE 102 a specific slice. Thus, the ANR-SC 302 xApp can provide slice level RAN neighbor visibility to enable enhancements to mobility management optimization via slice and RAN capability based mobility management for 5G and beyond.

The ANR table 500 comprises various entries associated with the ANR-SC 302 and the slicing capabilities. In order to enable 5G ANR-SC capability in 5G RAN, the following additional information elements (IEs) can be exchanged to the RIC 300 via an E2/X2 or gNBs/eNBs and added to the RIC NCRT. The "type" field can be added in relation to the 5G NR transmission point (TP) type (e.g., mmW, sub-6, or the like) in the ANR table 500. The "slice capabilities" field can be added in relation to the 5G NR TP in the ANR table 500. The slice capabilities can indicate the real-time characteristics the physical cells 402 provides (e.g., ultra low latency (URLLC), high bandwidth throughput (H-BW), medium bandwidth throughput (M-BW), massive internet-of-things (MIoT) connectivity, vehicle-to-everything (V2X) support services, voice over new radio (VoNR) support, and the like). The NR direct connectivity field can suggest whether direct connectivity is preferred or whether it is supported at all.

Figure 6:
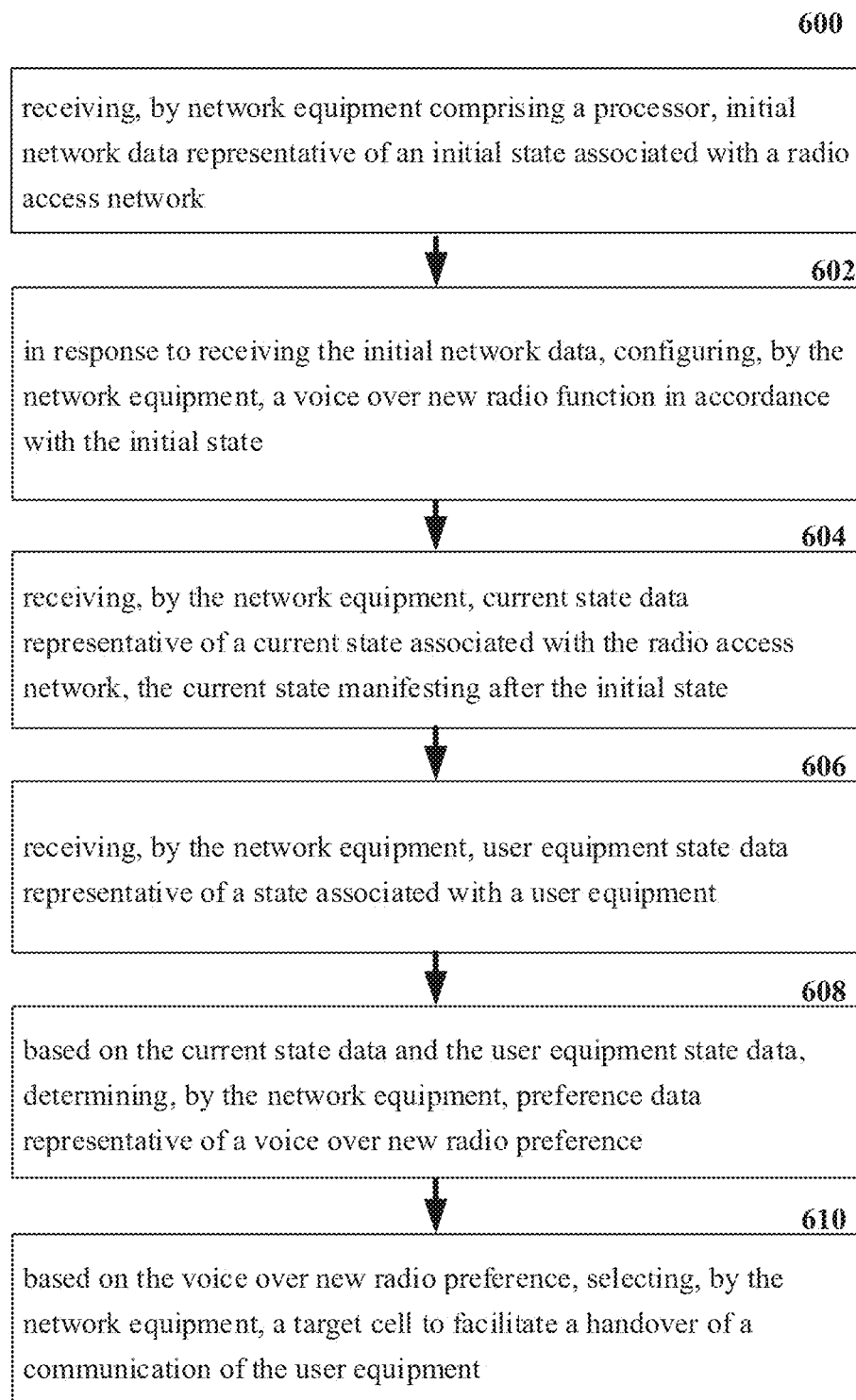
FIG. 6 illustrates an example flow diagram for a method for facilitating radio access neighbor relationships for a 5G network according to one or more embodiments.

Referring now to FIG. 6, illustrated is an example flow diagram for a method for facilitating radio access neighbor relationships for a 5G network according to one or more embodiments.

At element 600, the method can comprise receiving, by network equipment comprising a processor, cell data representative of a neighbor relationship between a first network cell and a second network cell. At element 602, the method can comprise receiving, by the network equipment, first capability data representative of a first capability of the first network cell, and second capability data representative of a second capability of the second network cell. At element 604, the method can comprise determining, by the network equipment, a difference between the first capability and the second capability. Additionally, based on the difference, at element 606, the method can comprise splitting, by the network equipment, the first network cell and the second network cell onto a first network slice and a second network slice, respectively. Furthermore, at element 608, in response to receiving resource request data representative of a resource requested from a user equipment, the method can comprise allocating, by the network equipment, the resource from the first network cell to the user equipment based on the first capability.

Figure 7:
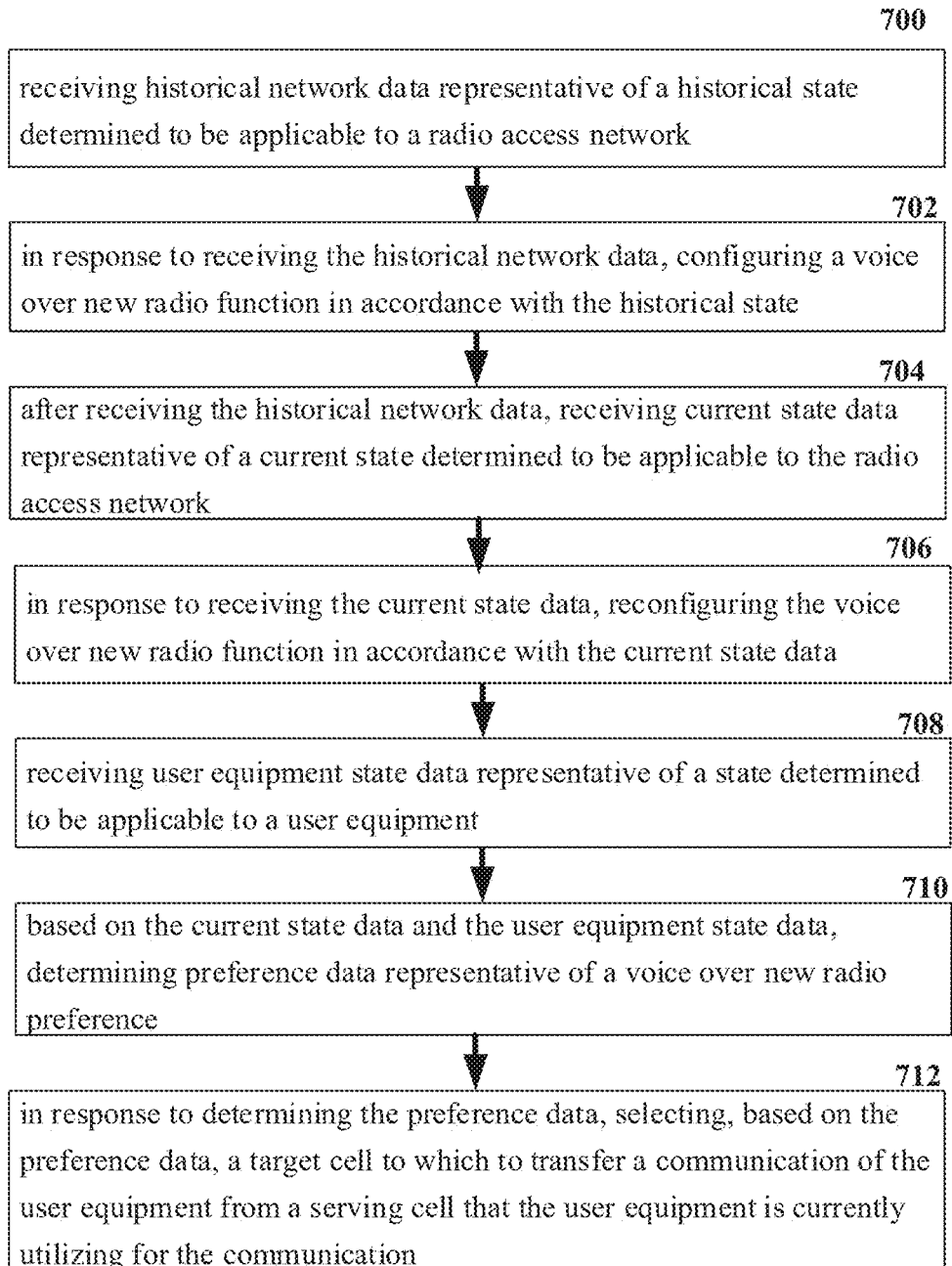
FIG. 7 illustrates an example flow diagram for a system for facilitating radio access neighbor relationships for a 5G network according to one or more embodiments.

Referring now to FIG. 7, illustrated is an example flow diagram for a system for facilitating radio access neighbor relationships for a 5G network according to one or more embodiments.

At element 700, the system can facilitate receiving first capability data representative of a first capability of the first network cell, and receiving second capability data representative of a second capability of the second network cell after determining a neighbor relationship between a first network cell and a second network cell. Based on determining that the first capability is different than the second capability, at element 702, the system can comprise allocating a first network slice, to the first network cell, that is different than a second network slice allocated to the second network cell. Additionally, at element 704, in response to receiving resource request data representative of a resource requested from a user equipment, the system can facilitate allocating a resource of the first network cell to the user equipment based on the first capability.

Figure 8:
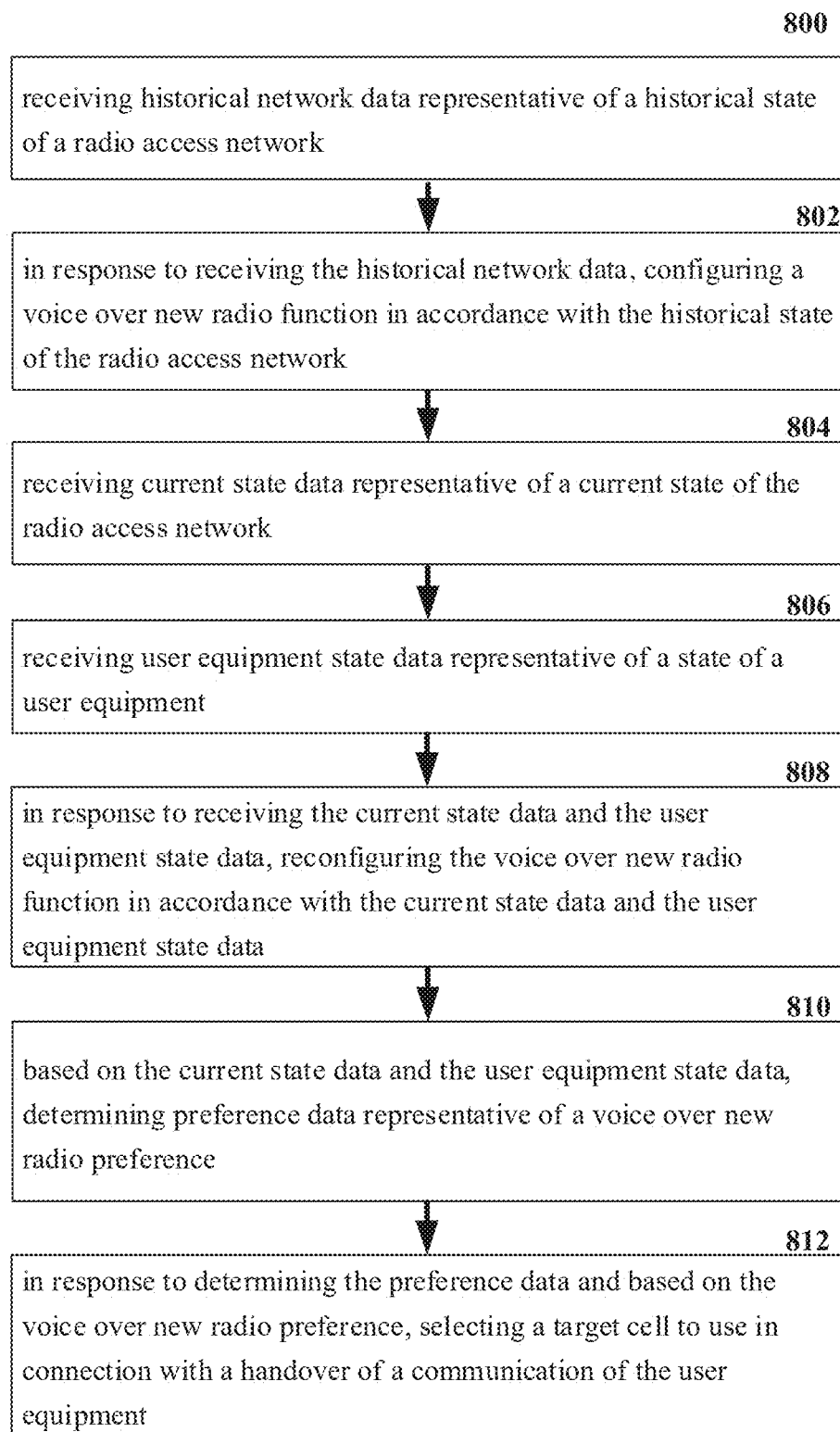
FIG. 8 illustrates an example flow diagram for a machine-readable medium for facilitating radio access neighbor relationships for a 5G network according to one or more embodiments.

Referring now to FIG. 8, illustrated is an example flow diagram for a machine-readable medium for facilitating radio access neighbor relationships for a 5G network according to one or more embodiments.

At element 800, the machine-readable medium can perform the operations comprising receiving neighbor relationship data representative of a neighbor relationship between a first network cell and a second network cell. At element 802, the machine-readable medium can perform the operations comprising receiving neighbor relationship data representative of a neighbor relationship between a first network cell and a second network cell. At element 804, the machine-readable medium can perform the operations comprising receiving first capability data representative of a first capability of the first network cell. At element 806, the machine-readable medium can perform the operations comprising receiving second capability data representative of a second capability of the second network cell. In response to receiving the neighbor relationship data, the machine-readable medium can perform the operations comprising the first capability data and the second capability data, determining that the first capability is different than the second capability. Based on the determining that the first capability is different than the second capability, at element 808, the machine-readable medium can perform the operations comprising allocating a first network slice, to the first network cell, that is different than a second network slice allocated to the second network cell. Furthermore, at element 810, in response to receiving resource request data representative of a resource requested from a user equipment, the machine-readable medium can perform the operations comprising allocating a resource of the first network cell to the user equipment based on the first capability.

Figure 9:
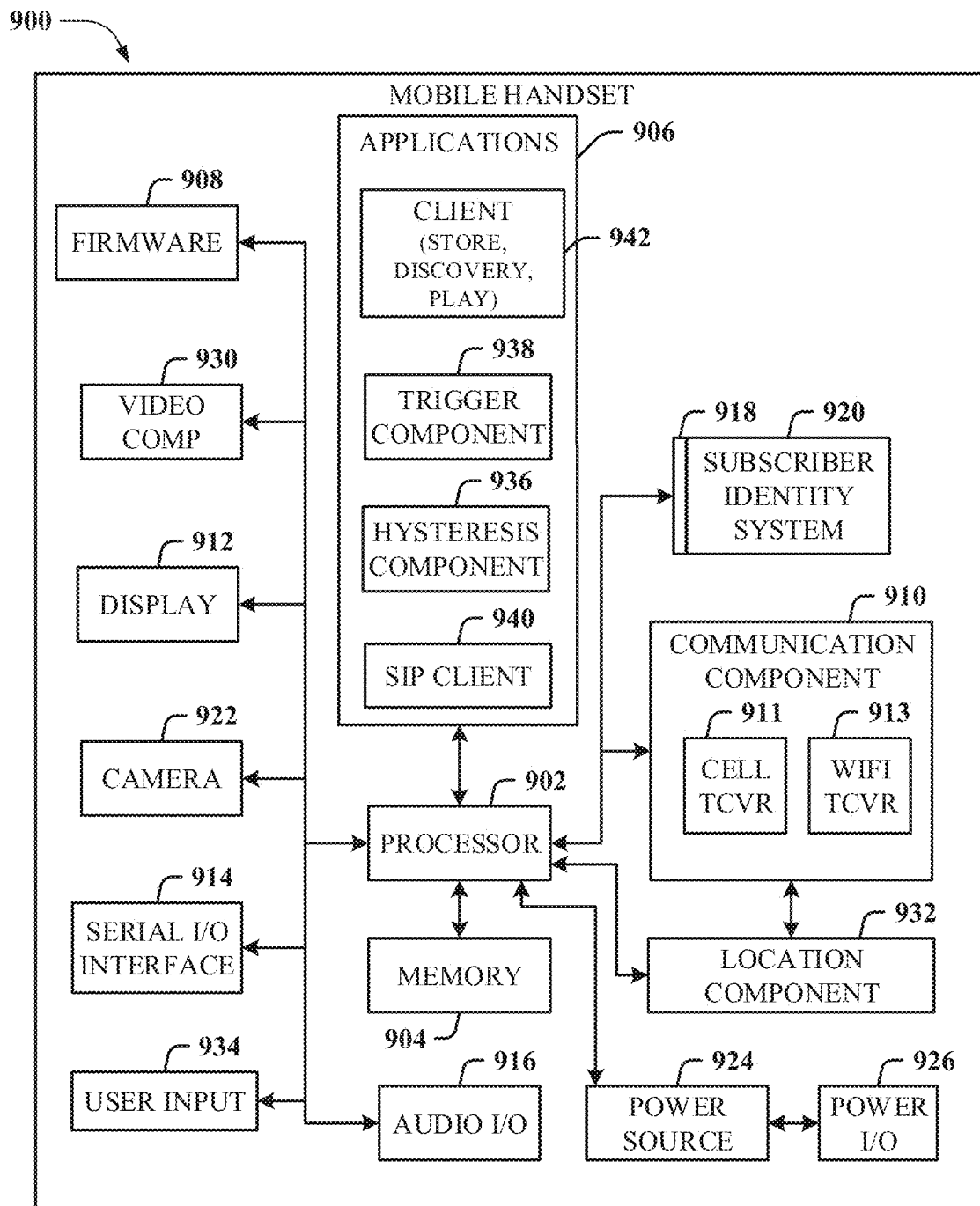
FIG. 9 illustrates an example block diagram of an example mobile handset operable to engage in a system architecture that facilitates secure wireless communication according to one or more embodiments described herein.

Referring now to FIG. 9, illustrated is a schematic block diagram of an exemplary end-user device such as a mobile device 900 capable of connecting to a network in accordance with some embodiments described herein. Although a mobile handset 900 is illustrated herein, it will be understood that other devices can be a mobile device, and that the mobile handset 900 is merely illustrated to provide context for the embodiments of the various embodiments described herein. The following discussion is intended to provide a brief, general description of an example of a suitable environment 900 in which the various embodiments can be implemented. While the description includes a general context of computer-executable instructions embodied on a machine-readable medium, those skilled in the art will recognize that the innovation also can be implemented in combination with other program modules and/or as a combination of hardware and software.

Generally, applications (e.g., program modules) can include routines, programs, components, data structures, etc., that perform particular tasks or implement particular abstract data types. Moreover, those skilled in the art will appreciate that the methods described herein can be practiced with other system configurations, including single-processor or multiprocessor systems, minicomputers, mainframe computers, as well as personal computers, hand-held computing devices, microprocessor-based or programmable consumer electronics, and the like, each of which can be operatively coupled to one or more associated devices.

A computing device can typically include a variety of machine-readable media. Machine-readable media can be any available media that can be accessed by the computer and includes both volatile and non-volatile media, removable and non-removable media. By way of example and not limitation, computer-readable media can include computer storage media and communication media. Computer storage media can include volatile and/or non-volatile media, removable and/or non-removable media implemented in any method or technology for storage of information, such as computer-readable instructions, data structures, program modules or other data. Computer storage media can include, but is not limited to, RAM, ROM, EEPROM, flash memory or other memory technology, CD ROM, digital video disk (DVD) or other optical disk storage, magnetic cassettes, magnetic tape, magnetic disk storage or other magnetic storage devices, or any other medium which can be used to store the desired information and which can be accessed by the computer.

Communication media typically embodies computer-readable instructions, data structures, program modules or other data in a modulated data signal such as a carrier wave or other transport mechanism, and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer-readable media.

The handset 900 includes a processor 902 for controlling and processing all onboard operations and functions. A memory 904 interfaces to the processor 902 for storage of data and one or more applications 906 (e.g., a video player software, user feedback component software, etc.). Other applications can include voice recognition of predetermined voice commands that facilitate initiation of the user feedback signals. The applications 906 can be stored in the memory 904 and/or in a firmware 908, and executed by the processor 902 from either or both the memory 904 or/and the firmware 908. The firmware 908 can also store startup code for execution in initializing the handset 900. A communications component 910 interfaces to the processor 902 to facilitate wired/wireless communication with external systems, e.g., cellular networks, VoIP networks, and so on. Here, the communications component 910 can also include a suitable cellular transceiver 911 (e.g., a GSM transceiver) and/or an unlicensed transceiver 913 (e.g., Wi-Fi, WiMax) for corresponding signal communications. The handset 900 can be a device such as a cellular telephone, a PDA with mobile communications capabilities, and messaging-centric devices. The communications component 910 also facilitates communications reception from terrestrial radio networks (e.g., broadcast), digital satellite radio networks, and Internet-based radio services networks.

The handset 900 includes a display 912 for displaying text, images, video, telephony functions (e.g., a Caller ID function), setup functions, and for user input. For example, the display 912 can also be referred to as a "screen" that can accommodate the presentation of multimedia content (e.g., music metadata, messages, wallpaper, graphics, etc.). The display 912 can also display videos and can facilitate the generation, editing and sharing of video quotes. A serial I/O interface 914 is provided in communication with the processor 902 to facilitate wired and/or wireless serial communications (e.g., USB, and/or IEEE 1394) through a hardwire connection, and other serial input devices (e.g., a keyboard, keypad, and mouse). This supports updating and troubleshooting the handset 900, for example. Audio capabilities are provided with an audio I/O component 916, which can include a speaker for the output of audio signals related to, for example, indication that the user pressed the proper key or key combination to initiate the user feedback signal. The audio I/O component 916 also facilitates the input of audio signals through a microphone to record data and/or telephony voice data, and for inputting voice signals for telephone conversations.

The handset 900 can include a slot interface 918 for accommodating a SIC (Subscriber Identity Component) in the form factor of a card Subscriber Identity Module (SIM) or universal SIM 920, and interfacing the SIM card 920 with the processor 902. However, it is to be appreciated that the SIM card 920 can be manufactured into the handset 900, and updated by downloading data and software.

The handset 900 can process IP data traffic through the communication component 910 to accommodate IP traffic from an IP network such as, for example, the Internet, a corporate intranet, a home network, a person area network, etc., through an ISP or broadband cable provider. Thus, VoIP traffic can be utilized by the handset 900 and IP-based multimedia content can be received in either an encoded or decoded format.

A video processing component 922 (e.g., a camera) can be provided for decoding encoded multimedia content. The video processing component 922 can aid in facilitating the generation, editing and sharing of video quotes. The handset 900 also includes a power source 924 in the form of batteries and/or an AC power subsystem, which power source 924 can interface to an external power system or charging equipment (not shown) by a power I/O component 926.

The handset 900 can also include a video component 930 for processing video content received and, for recording and transmitting video content. For example, the video component 930 can facilitate the generation, editing and sharing of video quotes. A location tracking component 932 facilitates geographically locating the handset 900. As described hereinabove, this can occur when the user initiates the feedback signal automatically or manually. A user input component 934 facilitates the user initiating the quality feedback signal. The user input component 934 can also facilitate the generation, editing and sharing of video quotes. The user input component 934 can include such conventional input device technologies such as a keypad, keyboard, mouse, stylus pen, and/or touch screen, for example.

Referring again to the applications 906, a hysteresis component 936 facilitates the analysis and processing of hysteresis data, which is utilized to determine when to associate with the access point. A software trigger component 938 can be provided that facilitates triggering of the hysteresis component 938 when the Wi-Fi transceiver 913 detects the beacon of the access point. A SIP client 940 enables the handset 900 to support SIP protocols and register the subscriber with the SIP registrar server. The applications 906 can also include a client 942 that provides at least the capability of discovery, play and store of multimedia content, for example, music.

The handset 900, as indicated above related to the communications component 910, includes an indoor network radio transceiver 913 (e.g., Wi-Fi transceiver). This function supports the indoor radio link, such as IEEE 802.11, for the dual-mode GSM handset 1100. The handset 900 can accommodate at least satellite radio services through a handset that can combine wireless voice and digital radio chipsets into a single handheld device.

Figure 10:
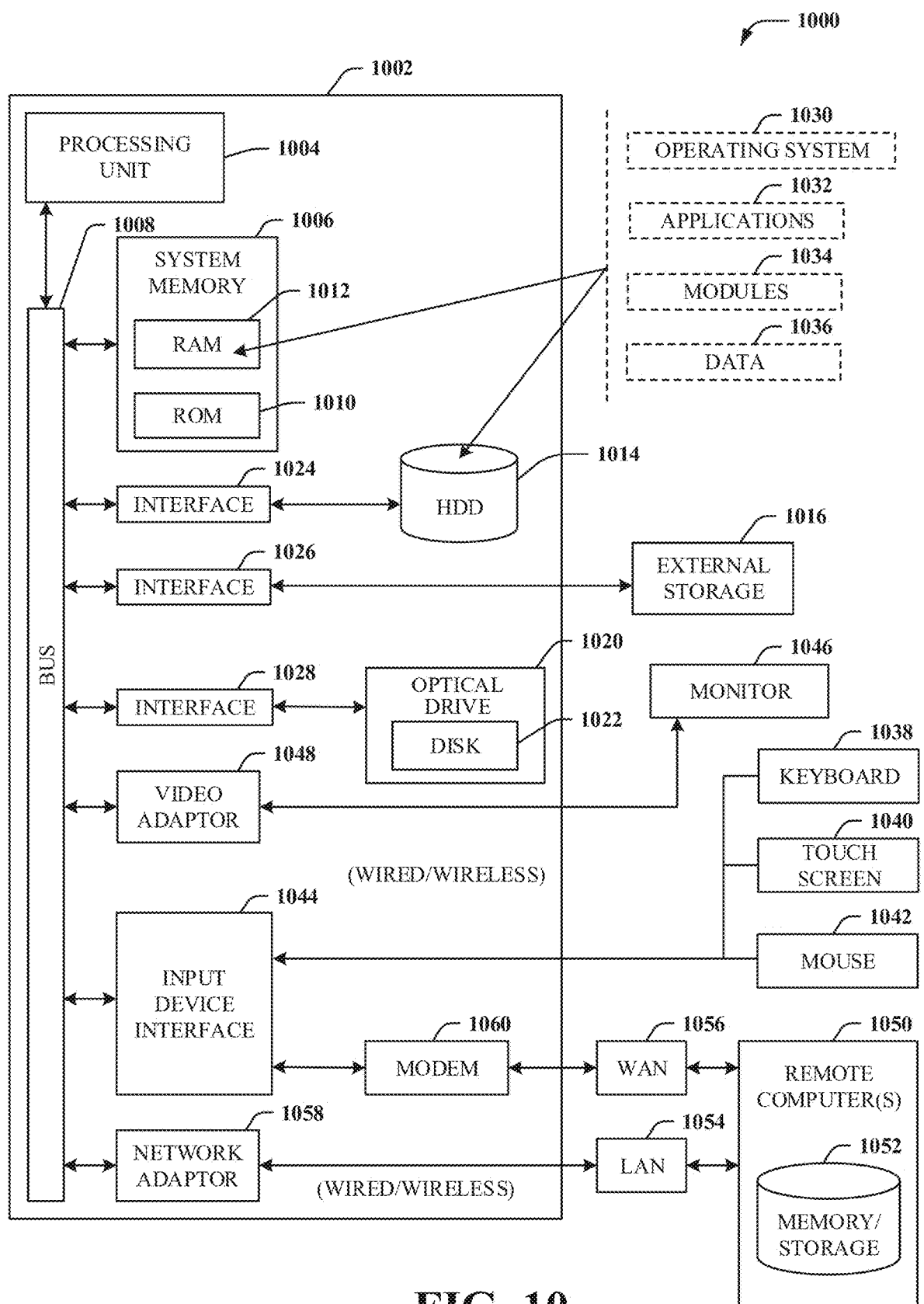
FIG. 10 illustrates an example block diagram of an example computer operable to engage in a system architecture that facilitates secure wireless communication according to one or more embodiments described herein.

In order to provide additional context for various embodiments described herein, FIG. 10 and the following discussion are intended to provide a brief, general description of a suitable computing environment 1000 in which the various embodiments of the embodiment described herein can be implemented. While the embodiments have been described above in the general context of computer-executable instructions that can run on one or more computers, those skilled in the art will recognize that the embodiments can be also implemented in combination with other program modules and/or as a combination of hardware and software.

Generally, program modules include routines, programs, components, data structures, etc., that perform particular tasks or implement particular abstract data types. Moreover, those skilled in the art will appreciate that the disclosed methods can be practiced with other computer system configurations, including single-processor or multiprocessor computer systems, minicomputers, mainframe computers, Internet of Things (IoT) devices, distributed computing systems, as well as personal computers, hand-held computing devices, microprocessor-based or programmable consumer electronics, and the like, each of which can be operatively coupled to one or more associated devices.

The illustrated embodiments of the embodiments herein can be also practiced in distributed computing environments where certain tasks are performed by remote processing devices that are linked through a communications network. In a distributed computing environment, program modules can be located in both local and remote memory storage devices.

Computing devices typically include a variety of media, which can include computer-readable media, machine-readable media, and/or communications media, which two terms are used herein differently from one another as follows. Computer-readable media or machine-readable media can be any available media that can be accessed by the computer and includes both volatile and nonvolatile media, removable and non-removable media. By way of example, and not limitation, computer-readable media or machine-readable media can be implemented in connection with any method or technology for storage of information such as computer-readable or machine-readable instructions, program modules, structured data or unstructured data.

Computer-readable storage media can include, but are not limited to, random access memory (RAM), read only memory (ROM), electrically erasable programmable read only memory (EEPROM), flash memory or other memory technology, compact disk read only memory (CD-ROM), digital versatile disk (DVD), Blu-ray disc (BD) or other optical disk storage, magnetic cassettes, magnetic tape, magnetic disk storage or other magnetic storage devices, solid state drives or other solid state storage devices, or other tangible and/or non-transitory media which can be used to store desired information. In this regard, the terms "tangible" or "non-transitory" herein as applied to storage, memory or computer-readable media, are to be understood to exclude only propagating transitory signals per se as modifiers and do not relinquish rights to all standard storage, memory or computer-readable media that are not only propagating transitory signals per se.

Computer-readable storage media can be accessed by one or more local or remote computing devices, e.g., via access requests, queries or other data retrieval protocols, for a variety of operations with respect to the information stored by the medium.

Communications media typically embody computer-readable instructions, data structures, program modules or other structured or unstructured data in a data signal such as a modulated data signal, e.g., a carrier wave or other transport mechanism, and includes any information delivery or transport media. The term "modulated data signal" or signals refers to a signal that has one or more of its characteristics set or changed in such a manner as to encode information in one or more signals. By way of example, and not limitation, communication media include wired media, such as a wired network or direct-wired connection, and wireless media such as acoustic, RF, infrared and other wireless media.

With reference again to FIG. 10, the example environment 1000 for implementing various embodiments of the aspects described herein includes a computer 1002, the computer 1002 including a processing unit 1004, a system memory 1006 and a system bus 1008. The system bus 1008 couples system components including, but not limited to, the system memory 1006 to the processing unit 1004. The processing unit 1004 can be any of various commercially available processors. Dual microprocessors and other multi-processor architectures can also be employed as the processing unit 1004.

The system bus 1008 can be any of several types of bus structure that can further interconnect to a memory bus (with or without a memory controller), a peripheral bus, and a local bus using any of a variety of commercially available bus architectures. The system memory 1006 includes ROM 1010 and RAM 1012. A basic input/output system (BIOS) can be stored in a non-volatile memory such as ROM, erasable programmable read only memory (EPROM), EEPROM, which BIOS contains the basic routines that help to transfer information between elements within the computer 1002, such as during startup. The RAM 1012 can also include a high-speed RAM such as static RAM for caching data.

The computer 1002 further includes an internal hard disk drive (HDD) 1014 (e.g., EIDE, SATA), one or more external storage devices 1016 (e.g., a magnetic floppy disk drive (FDD) 1016, a memory stick or flash drive reader, a memory card reader, etc.) and an optical disk drive 1020 (e.g., which can read or write from a CD-ROM disc, a DVD, a BD, etc.). While the internal HDD 1014 is illustrated as located within the computer 1002, the internal HDD 1014 can also be configured for external use in a suitable chassis (not shown). Additionally, while not shown in environment 1000, a solid state drive (SSD) could be used in addition to, or in place of, an HDD 1014. The HDD 1014, external storage device(s) 1016 and optical disk drive 1020 can be connected to the system bus 1008 by an HDD interface 1024, an external storage interface 1026 and an optical drive interface 1028, respectively. The interface 1024 for external drive implementations can include at least one or both of Universal Serial Bus (USB) and Institute of Electrical and Electronics Engineers (IEEE) 1394 interface technologies. Other external drive connection technologies are within contemplation of the embodiments described herein.

The drives and their associated computer-readable storage media provide nonvolatile storage of data, data structures, computer-executable instructions, and so forth. For the computer 1002, the drives and storage media accommodate the storage of any data in a suitable digital format. Although the description of computer-readable storage media above refers to respective types of storage devices, it should be appreciated by those skilled in the art that other types of storage media which are readable by a computer, whether presently existing or developed in the future, could also be used in the example operating environment, and further, that any such storage media can contain computer-executable instructions for performing the methods described herein.

A number of program modules can be stored in the drives and RAM 1012, including an operating system 1030, one or more application programs 1032, other program modules 1034 and program data 1036. All or portions of the operating system, applications, modules, and/or data can also be cached in the RAM 1012. The systems and methods described herein can be implemented utilizing various commercially available operating systems or combinations of operating systems.

Computer 1002 can optionally include emulation technologies. For example, a hypervisor (not shown) or other intermediary can emulate a hardware environment for operating system 1030, and the emulated hardware can optionally be different from the hardware illustrated in FIG. 10. In such an embodiment, operating system 1030 can include one virtual machine (VM) of multiple VMs hosted at computer 1002. Furthermore, operating system 1030 can provide runtime environments, such as the Java runtime environment or the .NET framework, for applications 1032. Runtime environments are consistent execution environments that allow applications 1032 to run on any operating system that includes the runtime environment. Similarly, operating system 1030 can support containers, and applications 1032 can be in the form of containers, which are lightweight, standalone, executable packages of software that include, e.g., code, runtime, system tools, system libraries and settings for an application.

Further, computer 1002 can be enable with a security module, such as a trusted processing module (TPM). For instance with a TPM, boot components hash next in time boot components, and wait for a match of results to secured values, before loading a next boot component. This process can take place at any layer in the code execution stack of computer 1002, e.g., applied at the application execution level or at the operating system (OS) kernel level, thereby enabling security at any level of code execution.

A user can enter commands and information into the computer 1002 through one or more wired/wireless input devices, e.g., a keyboard 1038, a touch screen 1040, and a pointing device, such as a mouse 1042. Other input devices (not shown) can include a microphone, an infrared (IR) remote control, a radio frequency (RF) remote control, or other remote control, a joystick, a virtual reality controller and/or virtual reality headset, a game pad, a stylus pen, an image input device, e.g., camera(s), a gesture sensor input device, a vision movement sensor input device, an emotion or facial detection device, a biometric input device, e.g., fingerprint or iris scanner, or the like. These and other input devices are often connected to the processing unit 1004 through an input device interface 1044 that can be coupled to the system bus 1008, but can be connected by other interfaces, such as a parallel port, an IEEE 1394 serial port, a game port, a USB port, an IR interface, a BLUETOOTH® interface, etc.

A monitor 1046 or other type of display device can be also connected to the system bus 1008 via an interface, such as a video adapter 1048. In addition to the monitor 1046, a computer typically includes other peripheral output devices (not shown), such as speakers, printers, etc.

The computer 1002 can operate in a networked environment using logical connections via wired and/or wireless communications to one or more remote computers, such as a remote computer(s) 1050. The remote computer(s) 1050 can be a workstation, a server computer, a router, a personal computer, portable computer, microprocessor-based entertainment appliance, a peer device or other common network node, and typically includes many or all of the elements described relative to the computer 1002, although, for purposes of brevity, only a memory/storage device 1052 is illustrated. The logical connections depicted include wired/wireless connectivity to a local area network (LAN) 1054 and/or larger networks, e.g., a wide area network (WAN) 1056. Such LAN and WAN networking environments are commonplace in offices and companies, and facilitate enterprise-wide computer networks, such as intranets, all of which can connect to a global communications network, e.g., the Internet.

When used in a LAN networking environment, the computer 1002 can be connected to the local network 1054 through a wired and/or wireless communication network interface or adapter 1058. The adapter 1058 can facilitate wired or wireless communication to the LAN 1054, which can also include a wireless access point (AP) disposed thereon for communicating with the adapter 1058 in a wireless mode.

When used in a WAN networking environment, the computer 1002 can include a modem 1060 or can be connected to a communications server on the WAN 1056 via other means for establishing communications over the WAN 1056, such as by way of the Internet. The modem 1060, which can be internal or external and a wired or wireless device, can be connected to the system bus 1008 via the input device interface 1044. In a networked environment, program modules depicted relative to the computer 1002 or portions thereof, can be stored in the remote memory/storage device 1052. It will be appreciated that the network connections shown are example and other means of establishing a communications link between the computers can be used.

When used in either a LAN or WAN networking environment, the computer 1002 can access cloud storage systems or other network-based storage systems in addition to, or in place of, external storage devices 1016 as described above. Generally, a connection between the computer 1002 and a cloud storage system can be established over a LAN 1054 or WAN 1056 e.g., by the adapter 1058 or modem 1060, respectively. Upon connecting the computer 1002 to an associated cloud storage system, the external storage interface 1026 can, with the aid of the adapter 1058 and/or modem 1060, manage storage provided by the cloud storage system as it would other types of external storage. For instance, the external storage interface 1026 can be configured to provide access to cloud storage sources as if those sources were physically connected to the computer 1002.

The computer 1002 can be operable to communicate with any wireless devices or entities operatively disposed in wireless communication, e.g., a printer, scanner, desktop and/or portable computer, portable data assistant, commu-nications satellite, any piece of equipment or location associated with a wirelessly detectable tag (e.g., a kiosk, news stand, store shelf, etc.), and telephone. This can include Wireless Fidelity (Wi-Fi) and BLUETOOTH® wireless technologies. Thus, the communication can be a predefined structure as with a conventional network or simply an ad hoc communication between at least two devices.

The computer is operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, restroom), and telephone. This includes at least Wi-Fi and Bluetooth™ wireless technologies. Thus, the communication can be a predefined structure as with a conventional network or simply an ad hoc communication between at least two devices.

Wi-Fi, or Wireless Fidelity, allows connection to the Internet from a couch at home, a bed in a hotel room, or a conference room at work, without wires. Wi-Fi is a wireless technology similar to that used in a cell phone that enables such devices, e.g., computers, to send and receive data indoors and out; anywhere within the range of a base station. Wi-Fi networks use radio technologies called IEEE 802.11 (a, b, g, etc.) to provide secure, reliable, fast wireless connectivity. A Wi-Fi network can be used to connect computers to each other, to the Internet, and to wired networks (which use IEEE 802.3 or Ethernet). Wi-Fi networks operate in the unlicensed 2.4 and 5 GHz radio bands, at an 11 Mbps (802.11a) or 54 Mbps (802.11b) data rate, for example, or with products that contain both bands (dual band), so the networks can provide real-world performance similar to the basic 10BaseT wired Ethernet networks used in many offices.

The above description of illustrated embodiments of the subject disclosure, including what is described in the Abstract, is not intended to be exhaustive or to limit the disclosed embodiments to the precise forms disclosed. While specific embodiments and examples are described herein for illustrative purposes, various modifications are possible that are considered within the scope of such embodiments and examples, as those skilled in the relevant art can recognize.

In this regard, while the subject matter has been described herein in connection with various embodiments and corresponding FIGs, where applicable, it is to be understood that other similar embodiments can be used or modifications and additions can be made to the described embodiments for performing the same, similar, alternative, or substitute function of the disclosed subject matter without deviating therefrom. Therefore, the disclosed subject matter should not be limited to any single embodiment described herein, but rather should be construed in breadth and scope in accordance with the appended claims below.

What is claimed is:

1. A method, comprising:
   receiving, by network equipment comprising a processor, cell data representative of a neighbor relationship between a first network cell and a second network cell;
   receiving, by the network equipment:
   first capability data representative of a first capability of the first network cell, and
   second capability data representative of a second capability of the second network cell;
   determining, by the network equipment, a difference between the first capability and the second capability;

based on the difference, splitting, by the network equipment, the first network cell and the second network cell onto a first network slice and a second network slice, respectively; and in response to receiving resource request data representative of a resource requested from a user equipment, allocating, by the network equipment, the resource from the first network cell to the user equipment based on the first capability.

2. The method of claim 1, further comprising:

adding, by the network equipment, the first capability of the first network cell to a data structure.

3. The method of claim 2, wherein the first capability is an ultra-reliable low latency capability.

4. The method of claim 1, wherein allocating the resource is further based on a new radio preferred status representative of a preferred new radio to be utilized.

5. The method of claim 1, wherein a transmission point type is assigned to a base station associated with the first network cell.

6. The method of claim 5, wherein the transmission point type is a millimeter wave transmission point type.

7. The method of claim 5, wherein the transmission point type is a sub-6 gigahertz transmission point type.

8. A system, comprising:

a processor; and a memory that stores executable instructions that, when executed by the processor, facilitate performance of operations, comprising:

after determining a neighbor relationship between a first network cell and a second network cell, receiving first capability data representative of a first capability of the first network cell, and receiving second capability data representative of a second capability of the second network cell;

based on determining that the first capability is different than the second capability, allocating a first network slice, to the first network cell, that is different than a second network slice allocated to the second network cell; and in response to receiving resource request data representative of a resource requested from a user equipment, allocating a resource of the first network cell to the user equipment based on the first capability.

9. The system of claim 8, wherein the operations further comprise:

in response to allocating the first network slice to the first network cell, updating a data structure with relationship data representative of a relationship between the first network cell and the first network slice.

10. The system of claim 8, wherein the operations further comprise:

in response to allocating the first network slice to the first network cell, updating a data structure with relationship data representative of a management function associated with the first network cell.

11. The system of claim 10, wherein the management function is associated with a handover capability of the first network cell.

12. The system of claim 8, wherein the first network slice is associated with a high bandwidth capability according to a defined high bandwidth criterion.

13. The system of claim 9, wherein the second network slice is associated with a low bandwidth capability according to a defined low bandwidth criterion.

14. The system of claim 13, wherein the first network slice is associated with a massive internet-of-things connectivity capability.

15. A non-transitory machine-readable medium, comprising executable instructions that, when executed by a processor, facilitate performance of operations, comprising:

receiving neighbor relationship data representative of a neighbor relationship between a first network cell and a second network cell;

receiving first capability data representative of a first capability of the first network cell;

receiving second capability data representative of a second capability of the second network cell;

in response to receiving the neighbor relationship data, the first capability data and the second capability data, determining that the first capability is different than the second capability;

based on the determining that the first capability is different than the second capability, allocating a first network slice, to the first network cell, that is different than a second network slice allocated to the second network cell; and in response to receiving resource request data representative of a resource requested from a user equipment, allocating a resource of the first network cell to the user equipment based on the first capability.

16. The non-transitory machine-readable medium of claim 15, wherein the first capability is an ultra-low latency capability according to a defined ultra-low latency criterion.

17. The non-transitory machine-readable medium of claim 15, wherein operations further comprise:

receiving preference data representative of a preference for a millimeter wave transmission point type.

18. The non-transitory machine-readable medium of claim 17, wherein the operations further comprise:

in response to receiving the preference data, updating a data structure with the preference data.

19. The non-transitory machine-readable medium of claim 15, wherein the second capability is voice over new radio support capability.

20. The non-transitory machine-readable medium of claim 19, wherein the first capability is a vehicle to everything service capability.

* * * * *